United States Patent [19]

Forsyth

[11] 3,709,022
[45] Jan. 9, 1973

[54] METHOD AND APPARATUS FOR FABRICATING IMAGING MEANS

[75] Inventor: Robert P. Forsyth, Carlisle, Mass.
[73] Assignee: Polaroid Corporation, Cambridge, Mass.
[22] Filed: Oct. 22, 1970
[21] Appl. No.: 83,028

[52] U.S. Cl. .................................... 72/311, 72/452
[51] Int. Cl. ......................... B21d 11/04, B21j 9/18
[58] Field of Search ......... 72/76, 414, 446, 447, 406, 72/433; 18/44; 33/1 M, 189, 23 C; 425/385; 72/311, 450, 452

[56] References Cited

UNITED STATES PATENTS

| 3,239,941 | 3/1966 | Ahmer | 33/1 M X |
| 2,148,221 | 2/1939 | Schneider | 72/414 X |

FOREIGN PATENTS OR APPLICATIONS

| 261,701 | 9/1949 | Switzerland | 425/175 |

*Primary Examiner*—Charles W. Lanham
*Assistant Examiner*—R. M. Rogers
*Attorney*—Brown & Mikulka, William D. Roberson and Michael Bard

[57] ABSTRACT

A method and apparatus is provided for fabricating novel imaging apparatus.

The subject invention accomplishes its purpose by employing a graver which is driven into a base to produce a facet therein which is normal to the longitudinal axis of the graver. The graver is secured in predetermined relation with respect to a pair of points and is caused to traverse the surface of said base until a desired portion thereof is sufficiently covered with said facets. One of said pair of predetermined points corresponds to a point source of illumination or other electromagnetic radiation and the other of said pair of predetermined points corresponds to a point to which it is desired to reflect any electromagnetic radiation incident on said faceted base from said point source.

20 Claims, 5 Drawing Figures

INVENTOR.
ROBERT P. FORSYTH

BY Brown and Mikulka
and
Michael Bard
ATTORNEYS

PATENTED JAN 9 1973 3,709,022

INVENTOR.
ROBERT P. FORSYTH

BY
Brown and Mikulka
and
Michael Bard
ATTORNEYS

INVENTOR.
ROBERT P. FORSYTH

BY Brown and Mikulka
and
Michael Bard
ATTORNEYS 3,709,022

METHOD AND APPARATUS FOR FABRICATING IMAGING MEANS

BACKGROUND OF THE INVENTION

The subject invention relates generally to apparatus for imaging light or other electromagnetic radiation from a point source to a predetermined remote point and, more particularly, to a method and apparatus for the fabrication thereof.

It is well known that various types of apparatus have been employed in the prior art for precisely imaging radiation emanating from a point source to a predetermined remote point. Such devices have found application in various photographic applications and have additionally found application in spectroscopic and spectrometric devices.

It is known that light appearing to emanate from a point source may be reflected to a predetermined remote point by means of an ellipse-shape mirror. In order to accomplish such imaging, it is necessary that the apparent point source be coincident with one of the foci of the ellipse and that the predetermined remote point to which it is desired to reflect light to be coincident with the other foci of the ellipse.

As a practical expedient, a concave spherical-shape mirror was often substituted for the ellipse configuration to provide point-to-point reflection of light. In order to utilize such a substitute, it is necessary that the point source be positioned off the optical axis of the spherical-shape mirror. The ease of obtaining and/or fabricating such a concave spherical mirror and, hence, the desirability of its use for the purposes aforesaid, is readily apparent.

Not infrequently, however, it is necessary that the optical means utilized for imaging a real or apparent point source to another point be essentially flat or planar. Where such is the case, it has been found expedient to resort to a mirror utilizing the principles of a Fresnel lens. Such a mirror may be envisioned by considering a concave hemispheric mirror divided into a plurality of frusta, each formed by the intersection of a pair of spaced parallel planes with said mirror and normal to the optical axis thereof. If each of said plural frusta are concentrically arranged on a flat surface, a reflective device will be created approximating the same optical qualities as said concave hemispheric mirror, but one which is essentially planar. Such a planar approximation of a concave hemispheric-shape mirror may be referred to as a Fresnel-type mirror.

It should be readily apparent that for many applications, the Fresnel-type mirror is preferred to its concave hemispheric-shape counterpart, if for no other reasons, than because of its compactness of size and ease of fabrication.

Unfortunately, the use of a concave spherical-shape mirror or its Fresnel-type counterpart entails several disadvantages. As is well known in the art, the use of such structures invariably results in attendant image distortion due to the inherent aberrations in the mirror structures, such as astigmatism and coma. Coma, of course, is an aberration affecting only points off the optical axis, and it is known that coma is directly proportional to the distance of such points from such optical axis. It is known, too, that astigmatism varies with the square of the image height and, hence, we find that the very use to which we desire to put the concave hemispheric-shape mirror or its Fresnel-type counterpart, is one wherein significant coma and astigmatism will be introduced.

In order to provide a relatively aberration-free compact and accurate point-to-point reflective means, the novel mirror which is the subject of copending application Ser. No. 83,030 filed Oct. 22, 1970 by Nathan Gold and assigned to Polaroid Corporation, the assignee of the present application, was developed. Such a novel mirror will henceforth be referred to herein as a Gold-type mirror. Also developed was a method and apparatus for the fabrication of said novel mirrors and which is the subject of copending application Ser. No. 83,029 filed on Oct. 22, 1970 by William T. Plummer and assigned to Polaroid Corporation.

The instant invention was developed to provide an improved means for the manufacture of Gold-type mirrors accurately and efficiently.

Accordingly, it is an object of the present invention to provide a means for fabricating Gold-type mirrors.

Another object of the present invention is to provide a relatively simple and efficient means for the fabrication of Gold-type mirrors.

Still another object of this invention resides in the provision of a novel cam following mechanism for the automatic and efficient fabrication of Gold-type mirrors.

Yet another object of this invention resides in an extremely accurate and efficient method and means for automatically fabricating a master from which a die may be formed for the fabrication of Gold-type mirrors as by pressing, stamping, or rolling.

A further object of this invention is to provide an improved means for automatically positioning a graver with respect to a plate such that causing such graver to successively impact said plate along a preselected portion of its surface will effect a Gold-type mirror.

Yet a further object of the instant invention resides in the provision of improved and simple means for automatically shaping the surface of a non-reflective plate or the like to conform to that of a Gold-type mirror so that such a mirror may thereafter be formed by coating said formed surface with a reflective coating.

SUMMARY OF THE INVENTION

One aspect of the subject invention encompasses a novel mechanism which secures said graver for movement between a pair of cam wheels which are of a precisely predetermined radius and are secured at predetermined positions with respect to a pair of conjugate points, representing a point source of electromagnetic radiation and a point to which it is desired to reflect such radiation.

One of said precisely positioned cam wheels is rotatable about an axis normal thereto and passing centrally therethrough. The other of said pair of cam wheels is also rotatable about an axis passing centrally therethrough and normal thereto and is further pivotal about the axis of rotation of the other of said pair of cam wheels. Additionally, both of said pair of cam wheels are rotatable about a common axis passing through said conjugate points. Novel spring and slot means causes one of said cam wheels to rotate about the other whilst firmly securing said stylus therebetween.

A base to be fabricated into novel imaging means of the Goldrtype is fixedly positioned beneath said novel mechanism in precisely predetermined spaced relation to said pair of conjugate points. In operation, the graver is driven axially between said cam wheels so as to impact said base and form a facet in the surface thereof. The graver is caused to traverse the base, as by a cross-slide mechanism, until a desired portion of the surface of the base is covered with such facets. In traversing said base, said graver is caused to follow the surface of one of said cam wheels whilst said cam wheels are rotating about the axis passing through said conjugate points. Thus, the cam surface presented to the graver to follow is effectively of toroidal shape and the longitudinal axis of said graver will always bisect the angle formed by a pair of lines extending from said conjugate points to the particular facet being formed and be normal to such facet.

DESCRIPTION OF THE DRAWINGS

Other objects and many of the attendant advantages of the present invention will be better appreciated and said invention will become clearly understood with reference to the following detailed description when considered in conjunction with the accompanying drawings illustrating one embodiment of the instant invention, wherein.

DETAILED DESCRIPTION OF THE INVENTION

Figure 1:
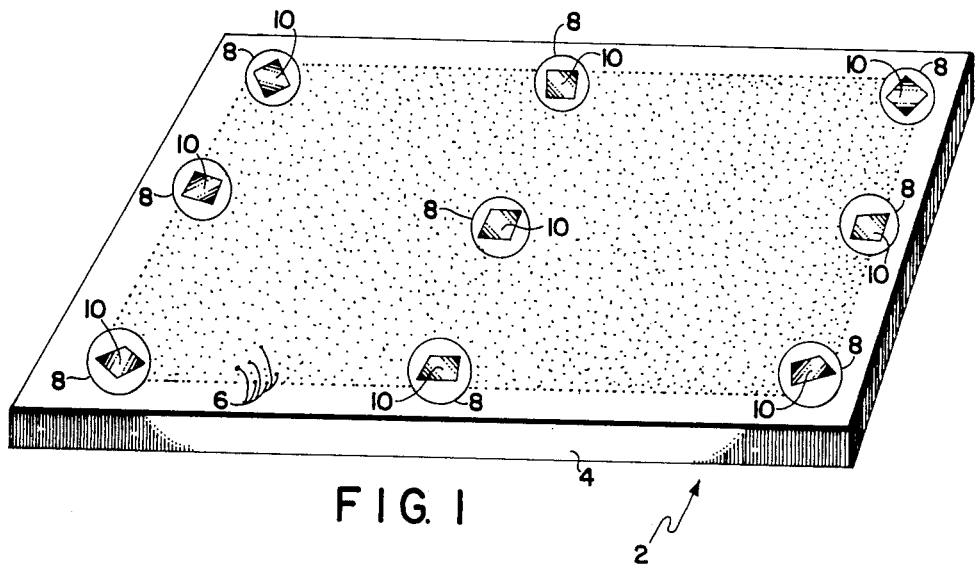
FIG. 1 provides a perspective of a Gold-type mirror.

Referring to the drawings in more detail, and, more particularly, to FIG. 1, a Gold-type mirror is illustrated generally at 2 and is seen to comprise an essentially flat plate 4. One surface of the plate 4 is covered with a plurality of indentations 6, each of which, as best seen in enlarged detail perspectives 8, comprises a facet 10.

Each said facet 10 is reflective to light and is so spatially oriented that light impinging thereon from a fixed point source will be reflected therefrom to a predetermined remote point. In order to accomplish such reflection, each said facet 10 must be so spatially positioned as to be normal to the bisector of the angle included between a line drawn from said point source to such facet and a line drawn from such facet to said predetermined remote point.

As taught in copending application, Ser. No. 83,030 mentioned hereinabove, the plate 4 may typically comprise aluminum or other suitable material and it may or may not be provided with a reflective coating on the faceted surface thereof.

Figure 2:
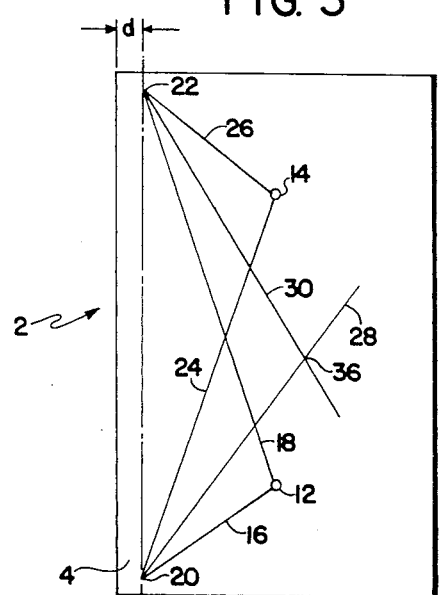
FIG. 2 provides a top plan of a pair of conjugate points positioned with respect to a base to be fabricated into a Gold-type mirror and illustrates a pair of light rays extending from one of said pair of conjugate points to a pair of remotely spaced points on the surface of said base and being reflected therefrom to the other of said conjugate points and further illustrates the angle bisectors associated with such rays.

Referring to FIG. 2 in more detail, the Gold-type mirror 2 comprising the plate 4, is shown disposed with respect to a pair of conjugate points 12 and 14. A pair of lines 16 and 18, corresponding to a pair of light rays, are shown extending from the point 12 to a pair of points 20 and 22, respectively, on the upper surface of the plate 4. The points 20 and 22 are seen to lie along a line a predetermined distance $d$ from one edge of the plate 4. A pair of lines 24 and 26 extend from the points 20 and 22, respectively, to the point 14 and correspond to light rays reflected from said respective points 20 and 22. A line 28 shown extending through the point 20 and bisecting the angle formed by the lines 16 and 24. Similarly, a line 30 is shown extending through the point 22 and bisecting the angle formed by the lines 18 and 26.

Figure 3:
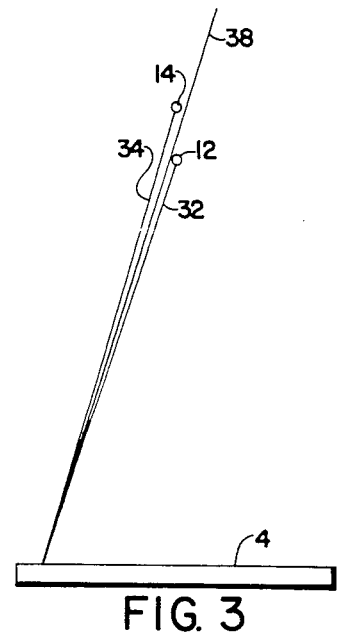
FIG. 3 provides a side elevation of the subject matter of FIG. 2.

It should be apparent that if we consider an infinite number of points, such as 20 and 22, lying along a line a distance $d$ from one edge of the plate 4, all of the lines such as 16 and 18 drawn to such points from the point 12 will lie in a single plane which, as best seen in FIG. 3 (in edge view), may be designated as the plane 32. Similarly, all of the lines such as 24 and 26 (corresponding to reflected light rays) extending from the points such as 20 and 22, along a line lying a distance $d$ from one edge of the plate 4, to the conjugate point 14 in a single plane which, as seen in edge view in FIG. 3, may be designated as the plane 34.

As best seen in FIG. 2, the lines 28 and 30 intersect at a point 36 and, by definition, the line 28 lies in the plane of the lines 16 and 24 whilst the line 30 lies in the plane of the lines 18 and 26. Nevertheless, as best seen in FIG. 3, each of the angle bisecting lines such as 28 and 30 for any points such as 20 or 22, lying a distance $d$ from one edge of the plate 4, will lie in a single plane which may be identified as the plane 38 distinct from the planes 32 and 34.

In order to more fully comprehend the subject invention, it is necessary to appreciate the nature of the intersection of the angle bisecting lines such as 28 and 30. Accordingly, it is necessary to view such angle bisecting lines normal to the plane 38 if their true relationship to be perceived. Accordingly, FIG. 4 provides an auxiliary perspective looking normal to the plane 38 of FIG. 3.

Figure 4:
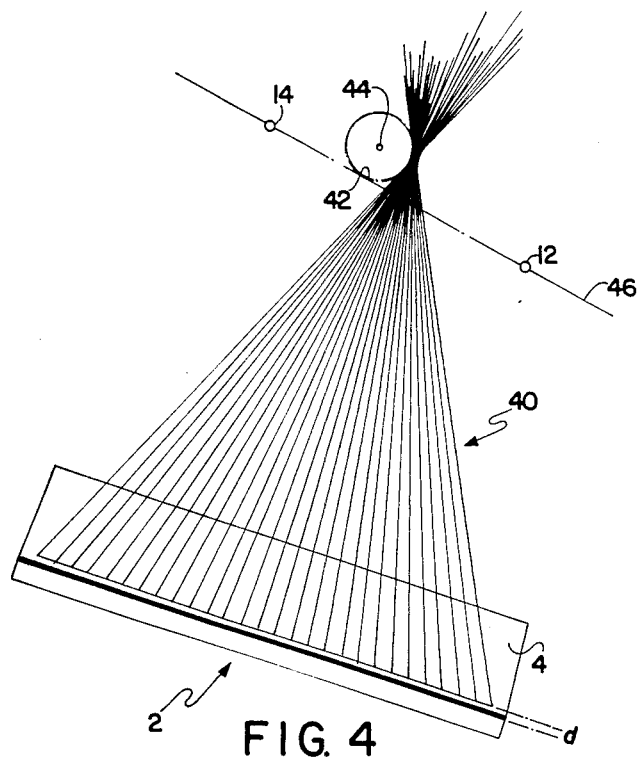
FIG. 4 provides an auxiliary perspective looking normal to the plane of the angle bisectors illustrated in FIG. 3.

Considering FIG. 4 in more detail, a plurality of angle bisecting lines are shown generally at 40 for a corresponding series of spaced points lying on the upper surface of the plate 4 and along a line a distance $d$ from one edge of said plate 4. The angle bisecting lines 40 correspond to the angle bisecting lines 28 and 30 for the points 20 and 22, respectively, of FIG. 2. Each of the lines 40 lie in a single plane 38 and intersect such that they are all tangent to a circle 42 of predetermined radius $r$ and having a geometric center 44 lying in predetermined spaced relation to the conjugate points 12 and 14.

It has been discovered that if we were to construct another set of angle bisectors such as 40 for a plurality of aligned points lying a different distance from said edge of the plate 4 than the distance $d$, such angle bisectors would lie in a different plane than the plane 38 but would still intersect so as to be approximately tangent to a circle of said radius $r$. The tangency circle for each set of angle bisectors corresponding to a different distance $d$ will correspond to the circle 42 rotated about an axis 46 passing through the conjugate points 12 and 14.

It should now be apparent that if we were to construct the angle bisectors for an infinite number of points lying along the surface of the plate 4 they would intersect so as to be approximately tangent to a toroidal surface corresponding to that generated by rotating the circle 42 about said axis 46.

Figure 5:
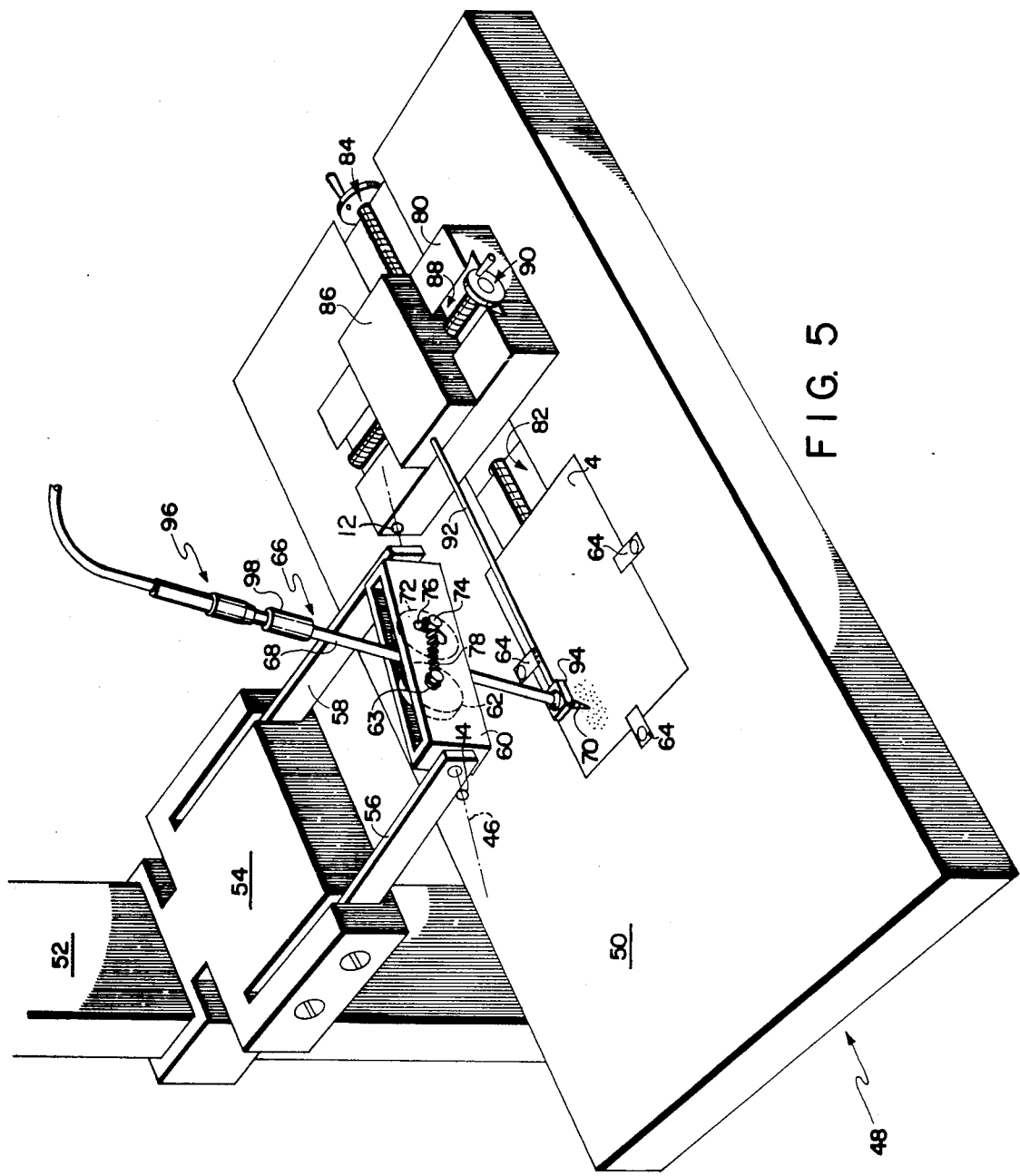
FIG. 5 provides a simplified perspective of the present invention.

Having perceived the novel geometrical relationships discovered by the Applicant, the specific details of the subject invention will be more readily understood. Accordingly, referring to FIG. 5 in more detail, the subject invention is illustrated generally at 48 and is seen to include a base 50 to which is affixed a vertical support 52. An adjustable mount 54 is secured to said support 52 so as to be vertically slideable thereon and extends normal thereto over the base 50. The adjustable mount 54 may be secured at any desired height on the support 52 as by means of set screws (not shown).

A pair of arms 56 and 58 extend outward of the mount 54 over the base 50 and a housing 60 is supported therebetween for rotation about the axis 46 extending through the conjugate points 12 and 14 of FIGS. 2 – 4. It should be noted that the arms 56 and 58 are independently adjustable so as to permit the housing 60 to be so positioned with respect to the base 50 that its axis of rotation is coincident with the axis 46. A circular disc cam 62 is disposed within the housing 60 so as to be both rotatable with the housing 60 about the axis 46 and also rotatable, within a plane containing said axis 46, about an axle 63.

The plate 4 of FIG. 1 is secured to the base 50 beneath the housing 60 and in predetermined spaced relation to the points 12 and 14, as by clamp assemblies 64. A graver 66 or the like comprising a longitudinally extending cylindrical body portion 68 extends through the housing 60 to a frusto-conical tip portion 70 or, alternately, to a tip portion having a predetermined nose radius. The graver 66 is biased into tangential engagement with the periphery of the disc cam 62 by means of a circular disc cam 72 which is secured within the housing 60 and is rotatable about an axle 74. The axle 74 extends transversely through the housing 60 and is slideable within an arcuate slot 76 having a predetermined radius of curvature equal to the radius of the circular disc cam 62 plus the diameter of the cylindrical body portion 68 plus the radius of the disc cam 72. Spring means 78 is connected between the axle 74 and the axle 63 and functions to bias the graver 66 into engagement with the periphery of the disc cam 62.

A platform 80 is secured to the base 50 via a dovetail slide 82 and threadably engages a lead screw and crank assembly 84 which functions to drive the plateform 80 longitudinally along the base 50 via the dovetail slide 82. A cross-slide 86 is secured to the platform 80 via a dovetail slide 88 and threadably engages a lead screw and crank assembly 90 so as to transversely traverse the platform 80 in response to rotation of said lead screw and crank assembly 90. The direction of movement of the cross-slide 86 with respect to the platform 80 is perpendicular to that of the platform 80 with respect to the base 50. Thus, rotation of both crank and lead screw assemblies 84 and 90 will cause the cross-slide 86 to traverse the base 50 in two mutually or orthogonal directions.

A connecting rod 92 is secured to said cross-slide 86 and extends longitudinally therefrom to a ball and socket assembly 94 which slideably receives one end portion of the cylindrical body portion 68 of the graver 66. A pneumatic driving tool 96, such as is commonly employed in the engraving arts, may be connected to the end of said graver 66 remote from said tip 70 via a collar 98 so as to effect the oscillatory sliding of said graver 66 between said cams 62 and 72 and within said ball and socket assembly 94 such that the tip portion 70 oscillates toward and away from said base 50 and impacts the surface of said plate 4.

Considering the operation of the instant invention in more detail, the plate 4 is secured to the base 50 beneath the housing 60 and in predetermined spatial relationship to a pair of conjugate points lying along the axis of rotation 46 of the housing 60. The radius of the disc cam 62 and the spatial position of said cam 62 within the housing 60, with respect to the axis 46 and the conjugate points 12 and 14, are a function of the spatial relation between the plate 4 and said conjugate points 12 and 14 and may be readily determined in accordance with the principles illustrated herein in the discussion of FIGS. 2 – 4 supra.

The tip portion 70 of the graver 66 is caused to traverse said plate 4 by either independent or concurrent movement of the lead screw and crank assemblies 84 and 90. Simultaneously with such traverse, the pneumatic driver 96 will cyclically drive the graver 66 and its tip portion 70 toward and away from said plate 4 causing said tip portion 70 to impact the top surface of said plate 4 and create a permanent indentation therein conforming to one of said facets 10. The tip portion 70 of the graver 66 is caused to traverse the top surface of said plate 4 until a desired area of the surface thereof is covered with indentations 6, each corresponding to a facet 10 as illustrated in FIG. 1.

By virtue of the novel cam and housing mechanism herein described, the longitudinal axis of the graver 66 will always bisect the angle formed by a pair of lines drawn from said conjugate points 12 and 14 and intersecting the surface of said plate 4 at the point of contact between said tip portion 70 and said top surface of said plate 4.

In view of the foregoing, it should not be clear that each of the facets 10 (FIG. 1) will be normal to a line bisecting the angle subtended by two lines, each passing through a different one of a pair of conjugate points (corresponding to the points 12 and 14) and intersecting at said facet. If a point source of illumination or other electromagnetic radiation were positioned at either one of said pair of conjugate points, any radiation therefrom incident on the faceted surface of said plate 4 would be reflected therefrom to the other of said conjugate points.

Clearly then, a Gold-type mirror may be manufactured for a particular pair of conjugate points by so designing the housing 60 and the cam 62 and suitably spatially positioning same with respect to the plate 4.

Accordingly, it can readily be seen that many variations and modifications of the present invention are possible in the light of the aforementioned teachings, and it will be apparent to those skilled in the art that various changes in form and arrangement of components may be made to suit requirements without departing from the spirit and scope of the invention. It is therefore to be understood that within the scope of the appended claims, the instant invention may be practiced in a manner otherwise than is specifically described herein.

What is claimed is:

1. Apparatus for fabricating a specular imaging device from a work blank, including:
   means defining a pair of stationary spaced reference points;
   an elongated graver or the like for shaping the surface of said work blank; and
   cam means for causing said graver or the like to traverse the surface of said work blank such that the longitudinal axis of said graver or the like will always effectively bisect the angle formed by a pair of lines lying in the plane of said longitudinal axis and extending through said reference points so as to effectively intersect at the intersection of said longitudinal axis with said surface.

2. Apparatus according to claim 1, wherein said cam means includes a housing rotatably mounted about an axis passing through said pair of reference points.

3. The invention as recited in claim 2, wherein said cam means includes a first circular disk cam secured to said housing so as to be rotatable therewith about said axis passing through said pair of reference points.

4. The invention as delineated in claim 3, wherein said graver or the like extends through said housing tangential to the periphery of said first circular disk cam and rotatable therewith about said axis passing through said pair of reference points.

5. The invention as set forth in claim 4, further including means connected to said housing and said first disk cam for biasing said graver into engagement with said first disk cam.

6. The invention as described in claim 5, wherein said housing is provided with an arcuate slot and said biasing means comprises a second circular disk cam having an axle disposed within said arcuate slot whereby said second disk cam may simultaneously rotate with said housing and traverse said arcuate slot.

7. The invention of claim 6, wherein said graver is generally cylindrical and said arcuate slot has a radius of curvature equal to the sum of that of said first and second disk cams plus the diameter of said cylindrical graver.

8. The invention according to claim 7, further including spring means connected between said first and second disk cams for radially biasing same toward each other.

9. The invention as described in claim 8, further including means for axially driving said graver or the like.

10. The invention of claim 9, wherein said graver or the like extends to a generally frustoconical shape tip having a predetermined end surface geometry.

11. The invention as delineated in claim 10, further including a base and means for rotatably securing said housing and locating said reference points in predetermined spaced relation with respect to said base.

12. The invention as set forth in claim 11, additionally including:
    a platform slideably secured to said base;
    cross-slide means slideably secured to said platform; and
    means fixedly connected to said cross-slide means for slaving said graver or the like thereto.

13. The invention as set forth in claim 12, further including means for driving said platform across said base and means for driving said cross-slide across said platform transverse to the direction of travel of said platform.

14. The invention as stated in claim 13, additionally including means for securing a shapable work blank to said base in predetermined spaced relation to said reference points.

15. A method for fabricating specular imaging devices, including the steps of:
    positioning a plate or the like in predetermined spaced relation to a pair of stationary spaced reference points;
    traversing said plate with the tip of a graver or the like;
    causing said graver or the like to rotate about a first axis passing through said reference points whilst simultaneously rotating about a second axis a predetermined fixed distance from said first axis so as to define a circular path with respect to said second axis; and
    causing said tip to impact said plate whilst traversing same so as to form plural discrete facets therein.

16. A mechanism for the manufacture of reflective imaging apparatus, including:
    means defining a pair of stationary spaced reference points;
    graver means;
    means defining a circular path of predetermined radius;
    means for rotating said circular path defining means about an axis passing through said reference points; and
    means for cyclically causing said graver means to impact the surface of a plate or the like and form plural indented surfaces therein whilst tangentially contacting said circular path whereby said surfaces will each be normal to a line bisecting the angle formed by extending a line through each of said reference points so as to intersect at such indented surface.

17. The invention according to claim 16, wherein said circular path defining means includes a circular cam.

18. The invention as set forth in claim 17, wherein said means for rotating said circular path defining means includes a housing rotatable about an axis passing through said reference points.

19. The invention as delineated in claim 18, wherein said circular cam is secured to said housing so as to be simultaneously rotatable therewith and rotatable, within a plane containing said axis passing through said reference points, about an axis normal to said plane and lying in predetermined spaced relation to said axis passing through said reference points.

20. The invention as stated in claim 19, further including means for biasing said graver or the like into engagement with the periphery of said circular cam.

* * * * *